United States Patent
Andreasen et al.

(10) Patent No.: US 12,467,671 B2
(45) Date of Patent: Nov. 11, 2025

(54) METHOD FOR FAULT TOLERANT CONTROL OF A VAPOUR COMPRESSION SYSTEM

(71) Applicant: Danfoss A/S, Nordborg (DK)

(72) Inventors: Glenn Andreasen, Nordborg (DK); Roozbeh Izadi-Zamanabadi, Sønderborg (DK)

(73) Assignee: DANFOSS A/S, Nordborg (DK)

( * ) Notice: Subject to any disclaimer, the term of this patent is extended or adjusted under 35 U.S.C. 154(b) by 154 days.

(21) Appl. No.: 18/044,127

(22) PCT Filed: Sep. 7, 2021

(86) PCT No.: PCT/EP2021/074605
§ 371 (c)(1),
(2) Date: Mar. 6, 2023

(87) PCT Pub. No.: WO2022/053461
PCT Pub. Date: Mar. 17, 2022

(65) Prior Publication Data
US 2024/0159438 A1 May 16, 2024

(30) Foreign Application Priority Data
Sep. 8, 2020 (EP) .................................... 20195068

(51) Int. Cl.
*F25B 49/02* (2006.01)

(52) U.S. Cl.
CPC .......... *F25B 49/02* (2013.01); *F25B 2500/19* (2013.01); *F25B 2700/172* (2013.01);
(Continued)

(58) Field of Classification Search
CPC ............................ F25B 49/02; F25B 2500/19; F25B 2700/172; F25B 2700/195; F25B 2700/2106; F25B 2700/21163
See application file for complete search history.

(56) References Cited

U.S. PATENT DOCUMENTS

| 7,024,873 B2 | 4/2006 | Yoo |
| 8,100,167 B2 | 1/2012 | Thybo et al. |

(Continued)

FOREIGN PATENT DOCUMENTS

| CN | 104501351 A | 4/2015 |
| CN | 106352636 A | 1/2017 |

(Continued)

OTHER PUBLICATIONS

Li, A kind of cold-hot combined supply system of accumulating type composite solar thermal-arrest and heat pump, 2017, Full Document (Year: 2017).*

(Continued)

*Primary Examiner* — Nael N Babaa
(74) *Attorney, Agent, or Firm* — McCormick, Paulding & Huber PLLC

(57) ABSTRACT

A method for controlling a vapour compression system (1) is disclosed. The vapour compression system (1) has an ambient temperature sensor (8) arranged to measure an ambient temperature. A time period during which the ambient temperature sensor (8) is unexposed to solar heating is selected. During the selected time period, measurements of the ambient temperature are obtained by means of the ambient temperature sensor (8), and measurements of at least one further parameter related to the vapour compression system (1) are obtained, while operating the vapour compression system (1). Model parameters for a model of at least a part of the vapour compression system (1) are derived, based on the obtained measurements, the model providing correlation between the ambient temperature and the at least one further parameter. Subsequently, the vapour compression system (1) is operated based on measurements of the at least one further parameter and based on ambient (Continued)

temperatures derived by means of the model including the derived model parameters.

20 Claims, 5 Drawing Sheets

(52) U.S. Cl.
CPC . *F25B 2700/195* (2013.01); *F25B 2700/2106* (2013.01); *F25B 2700/21163* (2013.01)

(56) References Cited

U.S. PATENT DOCUMENTS

| | | | |
|---|---|---|---|
| 8,239,168 | B2 | 8/2012 | House et al. |
| 2004/0045305 | A1 | 3/2004 | Murase et al. |
| 2013/0139529 | A1 | 6/2013 | Lu et al. |
| 2013/0327077 | A1* | 12/2013 | Motsenbocker ...... F25B 27/005 62/324.1 |
| 2017/0242048 | A1* | 8/2017 | Sommer ................ G01P 15/02 |
| 2018/0001745 | A1 | 1/2018 | Vehr et al. |
| 2019/0301780 | A1 | 10/2019 | Schmidt et al. |

FOREIGN PATENT DOCUMENTS

| | | | | |
|---|---|---|---|---|
| CN | 107270580 | A | * 10/2017 | ............ F25B 29/003 |
| CN | 107940842 | A | 4/2018 | |
| CN | 109140852 | A | 1/2019 | |
| CN | 109990463 | A | 7/2019 | |
| EP | 0 364 237 | A2 | 4/1990 | |
| EP | 3074706 | A2 | 10/2016 | |
| JP | 5602519 | B2 | 10/2014 | |
| WO | 2015/079242 | A2 | 6/2015 | |
| WO | 2016150664 | A1 | 9/2016 | |
| WO | 2018/005978 | A1 | 1/2018 | |

OTHER PUBLICATIONS

International Search Report mailed on Oct. 12, 2021, in connection with corresponding International Application No. PCT/EP2021/074605; 3 pages.

Indian First Examination Report and its English translation for corresponding Indian Patent Application No. 202317021205 dated Oct. 23, 2024.

* cited by examiner

METHOD FOR FAULT TOLERANT CONTROL OF A VAPOUR COMPRESSION SYSTEM

CROSS-REFERENCE TO RELATED APPLICATIONS

This application is a National Stage application of International Patent Application No. PCT/EP2021/074605, filed on Sep. 7, 2021, which claims priority to European Patent Application No. 20195068.0, filed on Sep. 8, 2020, each of which is hereby incorporated by reference in its entirety.

TECHNICAL FIELD

The present invention relates to a method for controlling a vapour compression system comprising an ambient temperature sensor arranged to measure an ambient temperature. The method according to the invention is fault tolerant with respect to solar heating of the ambient temperature sensor.

BACKGROUND

Vapour compression systems are normally controlled based on measurements performed by means of relevant sensors arranged near or forming part of the vapour compression system. Such sensors could, e.g., be pressure sensors and/or temperature sensors measuring pressure or temperature of refrigerant flowing in a refrigerant path of the vapour compression system, at selected positions along the refrigerant path. Alternatively or additionally, temperature sensors may be arranged to measure the temperature in one or more refrigerated volumes and/or an ambient temperature. In any event, reliable sensor measurements are necessary in order to ensure that the vapour compression system is operated in an appropriate manner, which provides required cooling or heating, while minimising energy consumption.

Accordingly, it is desirable to be able to determine if a sensor is providing faulty measurements, and to be able to mitigate or compensate for such faulty measurements. For instance, the ambient temperature has an impact on temperature and pressure conditions in the vapour compression system. More particularly, if the ambient temperature changes, the optimal refrigerant temperature and pressure values in the vapour compression system also change. Therefore, setpoint values for refrigerant pressure and/or refrigerant temperature, which are applied when controlling the vapour compression system, are sometimes calculated based on measurements of the ambient temperature. Faulty measurements of the ambient temperature may therefore lead to non-optimal setpoint values for refrigerant pressure and/or refrigerant temperature, and thereby to non-optimal operation of the vapour compression system. Accordingly, it is particularly relevant to obtain reliable measurements of the ambient temperature.

Ambient temperature sensors are often arranged in an outdoor environment. Accordingly, they are subjected to various weather conditions, including solar radiation. If the ambient temperature sensor is positioned in direct sunlight, or near a surface which is heated by solar radiation, e.g. a rooftop, metal shielding or the like, there is a risk that the ambient temperature sensor is heated. This may lead to the sensor measurements from the ambient temperature sensor which indicate an ambient temperature being above, sometimes well above, the actual ambient temperature. It is desirable to avoid this situation, or to at least be able to mitigate or compensate for it.

SUMMARY

It is an object of embodiments of the invention to provide a method for controlling a vapour compression system in which appropriate operation of the vapour compression system is ensured regardless of ambient conditions.

It is a further object of embodiments of the invention to provide a method for controlling a vapour compression system in which faulty measurements of ambient temperature can be mitigated and/or compensated.

The invention provides a method for controlling a vapour compression system, the vapour compression system comprising at least one compressor, a heat rejecting heat exchanger, at least one expansion device and at least one evaporator, arranged in a refrigerant path, each evaporator being arranged in thermal contact with a refrigerated volume, and each expansion device being arranged to supply refrigerant to an evaporator, the vapour compression system further comprising an ambient temperature sensor arranged to measure an ambient temperature, the method comprising the steps of:

selecting a time period during which the ambient temperature sensor is unexposed to solar heating, during the selected time period, obtaining measurements of the ambient temperature by means of the ambient temperature sensor, and obtaining measurements of at least one further parameter related to the vapour compression system, while operating the vapour compression system, deriving model parameters for a model of at least a part of the vapour compression system, based on the obtained measurements, the model providing correlation between the ambient temperature and the at least one further parameter, and subsequently operating the vapour compression system based on measurements of the at least one further parameter and based on ambient temperatures derived by means of the model including the derived model parameters.

Thus, the invention provides a method for controlling a vapour compression system. In the present context, the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises at least one compressor, a heat rejecting heat exchanger, at least one expansion device and at least one evaporator, arranged in a refrigerant path. Each expansion device is arranged to supply refrigerant to an evaporator. Accordingly, in the case that the vapour compression system comprises two or more evaporators, the refrigerant supply to each evaporator can be controlled individually by means of the corresponding expansion device. Furthermore, each evaporator is arranged in thermal contact with a refrigerated volume. The refrigerated volume(s) could, e.g., be in the form of display cases in a supermarket, rooms of a building provided with an air conditioning system, or any other suitable kind of volumes in need of cooling.

Thus, refrigerant flowing in the refrigerant path is compressed by means of the compressor before being supplied to the heat rejecting heat exchanger. When passing through the heat rejecting heat exchanger, heat exchange takes place between the refrigerant and a secondary fluid flow across the heat rejecting heat exchanger, in such a manner that heat is rejected from the refrigerant. Thereby the temperature of the refrigerant is decreased. The heat rejecting heat exchanger may be in the form of a condenser, in which case the refrigerant is at least partly condensed. Alternatively, the heat rejecting heat exchanger may be in the form of a gas cooler, in which case the refrigerant is cooled, but remains transcritical or is sub-cooled.

The heat rejecting heat exchanger may be arranged in an outdoor environment, such as on a rooftop or mounted on an outer wall of a building. In this case the secondary fluid flow across the heat rejecting heat exchanger may be a flow of ambient air, e.g. driven by means of one or more fans.

The refrigerant leaving the heat rejecting heat exchanger is supplied to the expansion device(s), possibly via a high pressure expansion device and a receiver, where the refrigerant undergoes expansion before being supplied to the respective evaporator(s). Thereby the refrigerant being supplied to the evaporator(s) is in a mixed gaseous and liquid state. In the evaporator(s) heat exchange takes place between the refrigerant and a secondary fluid flow in the respective refrigerated volume(s), in such a manner that heat is absorbed by the refrigerant, while the liquid part of the refrigerant is at least partly evaporated. Thereby cooling is provided to the refrigerated volume(s).

Finally, the refrigerant is once again supplied to the compressor(s).

Accordingly, refrigerant flowing in the refrigerant path is alternatingly compressed by the compressor(s) and expanded by the expansion device(s), while heat exchange takes place in the heat rejecting heat exchanger and the evaporator(s).

The vapour compression system further comprises an ambient temperature sensor arranged to measure an ambient temperature. The ambient temperature sensor may be positioned outside a building housing the vapour compression system, e.g. on a rooftop or mounted on an outer wall of the building. For instance, the ambient temperature sensor may be arranged in the vicinity of the heat rejecting heat exchanger. Thereby the ambient temperature sensor is exposed to weather conditions, including solar radiation.

In the method according to the invention, a time period is initially selected, during which the ambient temperature sensor is unexposed to solar heating. As described above, in the case that the ambient temperature sensor is arranged in direct sunlight, or near a surface which is heated due to exposure to solar radiation, there is a risk that the temperature sensor is heated, in which case the temperature measurements provided by the ambient temperature sensor may indicate a temperature which is above, possibly well above, the actual ambient temperature. Such measurements will normally be regarded as faulty measurements. However, when the ambient temperature sensor is unexposed to solar heating, it can be assumed that the measurements provided by the ambient temperature sensor are reliable. Thereby a time period during which the ambient temperature sensor is unexposed to solar heating may be regarded as a time period during which the ambient temperature sensor operates under fault free conditions.

It should be noted that, in the present context the term 'unexposed to solar heating' should be interpreted to cover situations where the ambient temperature sensor is not positioned in direct sunlight, as well as situations where structures close to the ambient temperature sensor are not heated by incoming solar radiation to an extent which causes unintended heating of the ambient temperature sensor, as described above. For instance, the selected time period could be a time period during which the sun has set, the ambient temperature sensor is arranged in the shade, cloudy condition occur, or any other suitable conditions which ensure that the ambient temperature sensor is not heated due to solar radiation.

During the selected time period, measurements of the ambient temperature are obtained by means of the ambient temperature sensor. Since these measurements are obtained under fault free conditions, it can be assumed that the measurements are reliable, i.e. they reflect the actually occurring ambient temperature accurately. Furthermore, also during the selected time period, measurements of at least one further parameter related to the vapour compression system are obtained, while operating the vapour compression system. The further parameters could, e.g., be relevant temperatures and/or pressures in the vapour compression system. This will be described in further detail below.

Thus, concurrent measurements of the ambient temperature and the at least one further parameter are obtained, while the vapour compression system is operating, and thereby a correlation between the ambient temperature and the at least one further parameter can be derived.

Next, model parameters are derived for a model of at least a part of the vapour compression system, based on the obtained measurements. The model provides correlation between the ambient temperature and the at least one further parameter. This is possible because the measurements provide correlated measurements of the ambient temperature and the at least one further parameter, during operation of the vapour compression system, as described above, and because the measurements provided by the ambient temperature sensor are obtained under fault free conditions, at least with respect to solar heating. Thus, the resulting model, including the derived model parameters, can be applied for subsequently deriving some of the originally measured parameters from measurements of other of the originally measured parameters. For instance, the ambient temperature can be derived from measurements of the at least one further parameter, by means of the model.

Thus, the vapour compression system is subsequently operated based on measurements of the at least one further parameter and based on ambient temperatures derived by means of the model including the derived model parameters. Thereby the vapour compression system can be operated based on reliable ambient temperature values, even in situations where the ambient temperature sensor is exposed to solar heating, and the measurements provided by the ambient temperature sensor are therefore unreliable. Accordingly, the vapour compression system can be operated appropriately, and in an energy efficient manner, even under condition where it is not possible to obtain reliable measurements from the ambient temperature sensor, due to exposure of the ambient temperature sensor to solar heating.

The model may be a model reflecting behaviour of at least a part of the vapour compression system. The model may reflect behaviour of the entire vapour compression system, or of only a part of the vapour compression system, such as a specific component, e.g. the heat rejecting heat exchanger, the high pressure side or the low pressure side. For instance, the model may reflect dynamical behaviour of at least a part of the vapour compression system, such as the behaviour of the system in response to various changes, such as changes in temperature level and/or pressure levels in the vapour compression system or in the vicinity of the vapour compression system. For instance, the model may reflect dynamical behaviour of the vapour compression system in response to changes in ambient temperature.

As an alternative, the model may be a stochastic model, or another suitable 'black box' model.

The model may be a model of at least the heat rejecting heat exchanger. For instance, the model may reflect heat transfer taking place in the heat rejecting heat exchanger, from the refrigerant to a secondary fluid flowing across the heat rejecting heat exchanger, e.g. in the form of a flow of ambient air. This heat transfer is sensitive to changes in the ambient temperature, and it is therefore relevant to apply a model which reflects this when performing the method according to the invention.

The step of selecting a time period may comprise selecting a time period during night time. In the present context the term 'night time' should be interpreted to mean a period of time which falls between a point in time where the sun sets and a point in time where the sun rises. Accordingly, by selecting a time period during night time as the fault free time period, it is efficiently ensured that the ambient temperature sensor is not exposed to solar heating, because the sun is not shining during night time.

Alternatively, the step of selecting a time period may comprise selecting a time period during which it is known that the ambient temperature sensor is in the shade, or selecting a time period during which cloudy conditions or shade conditions are detected.

The step of selecting a time period may comprise the steps of:
  measuring ambient temperatures during a continuous time interval of at least 24 hours, by means of the ambient temperature sensor,
  identifying time intervals with high ambient temperatures as day time and time intervals with low ambient temperatures as night time,
  calibrating a clock, based on the identified day times and night times, and
  selecting a time period during night time, based on the calibrated clock.

According to this embodiment, a distinction between time periods which are considered as 'day time' and time periods which are considered as 'night time' is determined empirically by continuously measuring ambient temperatures, by means of the ambient temperature sensor, during a continuous time period of at least 24 hours. Thus, the continuous time period covers at least one day and at least one night. It can be assumed that the ambient temperature is generally higher during day time than during night time. Accordingly, time intervals with high ambient temperatures are identified as day time and time intervals with low ambient temperatures are identified as night time.

These findings are then applied for calibrating a clock, and a time period during night time can subsequently be selected, based on the calibrated clock.

One advantage of this embodiment is, that the method can be implemented in any vapour compression system, without requiring that information regarding local conditions, such as time zone, duration of day or night, shade conditions, etc., is provided. Instead, the method can be implemented in a 'plug-and-play' manner, in which the system calibrates itself, based on measurements performed by the available sensors.

As an alternative, a time period during night time may be selected based on a clock which is calibrated to the time zone in which the vapour compression system is located, possibly combined with information regarding times of sunset and sunrise at this location.

The step of deriving model parameters may comprise constructing a linear data driven model. In the present context the term 'data driven model' should be interpreted to mean a model which allows finding relationships between system variables, i.e. input and output, without explicit knowledge of the physical behaviour of the system. Instead, on-line system identification is performed. Thus, data driven models are suitable for systems where certain conditions are unknown. Accordingly, applying a data driven model when performing the method according to the invention, allows the method to be implemented in a 'plug-and-play' manner. Data driven models may be referred to as 'black box' models. Data driven models are simple, ensure fast computation time. Furthermore, convex optimisation leads to guaranteed estimation of an optimal set of model parameters.

As an alternative, the model may be a non-linear data driven model, a stochastic model, or any other suitable kind of 'black box' model.

As another alternative, a 'white box' model may be applied, i.e. a physical model in which a physical parameter may be estimated.

As yet another alternative, a combination of a 'white box' model and a data driven or 'black box' model may be applied. For instance, the step of operating the vapour compression system under fault free conditions while estimating the ambient temperature may be regarded as a 'white box' approach. Further simplification may then be applied by obtaining a linear model using a data driven system identification method and estimating the model parameters. This approach is easy to verify and ensures robust and easy porting between different systems.

The at least one further parameter may comprise fan speed of a fan driving a secondary fluid flow across the heat rejecting heat exchanger and/or temperature of refrigerant leaving the heat rejecting heat exchanger.

The fan speed of a fan driving a secondary fluid flow across the heat rejecting heat exchanger determines the flow rate of the secondary fluid, e.g. in the form of a flow of ambient air. This has an impact on the heat transfer taking place in the heat rejecting heat exchanger. When the ambient temperature increases, it is also necessary to increase the fan speed in order to ensure sufficient heat transfer from the refrigerant to the secondary fluid, thereby maintaining a required temperature of the refrigerant leaving the heat rejecting heat exchanger. Accordingly, the fan speed is related to the ambient temperature, and it is therefore suitable to apply this as a further parameter in the method according to the invention.

The temperature of refrigerant leaving the heat rejecting heat exchanger is also affected by changes in the ambient temperature. For instance, in the case that the secondary fluid flow across the heat rejecting heat exchanger is a flow of ambient air, then the temperature of refrigerant leaving the heat rejecting heat exchanger will never be lower than the ambient temperature. Accordingly, it is also suitable to apply the temperature of refrigerant leaving the heat rejecting heat exchanger as a further parameter in the method according to the invention. Finally, the temperature of refrigerant leaving the heat rejecting heat exchanger has a very strong coupling to the ambient temperature, and it is therefore very suitable to use this parameter as a further parameter.

The step of subsequently operating the vapour compression system may comprise deriving a setpoint value for a temperature and/or a pressure of refrigerant leaving the heat rejecting heat exchanger, based on the derived ambient temperature, and subsequently operating the vapour compression system in accordance with the derived setpoint value(s).

As described above, the ambient temperature has an impact on the operation of the vapour compression system, in terms of optimal levels for refrigerant pressures and refrigerant temperatures prevailing in various parts of the vapour compression system. In particular, optimal values for the temperature and the pressure of refrigerant leaving the heat rejecting heat exchanger are sensitive to variations in the ambient temperature. It is therefore advantageous to derive setpoint values of the temperature and/or the pressure of refrigerant leaving the heat rejecting heat exchanger, based on the true ambient temperature. In the method according to the invention, the derived ambient temperature represents the true ambient temperature. Therefore, by deriving the setpoint values based on the derived ambient temperature, it can be ensured that the setpoint values reflect the true ambient temperature, even if reliable measurements from the ambient temperature sensor are not available due to solar heating. Accordingly, it is ensured that the vapour compression system is operated in an optimal manner at all times, and regardless of whether or not the ambient temperature sensor is faulty.

Alternatively or additionally, the step of subsequently operating the vapour compression system may comprise deriving an ambient temperature correction, based on the model and the derived model parameters, and correcting ambient temperatures measured by means of the ambient temperature sensor by the ambient temperature correction.

According to this embodiment, the ambient temperature is not necessarily derived directly from the model and the measured at least one further parameter. Instead it is determined whether the measurements obtained by means of the ambient temperature sensor may be considered as reliable or faulty. For instance, the measurements obtained by means of the ambient temperature sensor may be compared to ambient temperature values derived by means of the model. As long as there is consistency between the measured ambient temperature and the derived ambient temperature, the measurements values may be considered reliable. However, if the measured ambient temperature and the derived ambient temperature differ from each other by a certain amount, it may be assumed that the measurements obtained by means of the ambient temperature sensor are faulty. A correction may then be derived, based on the comparison, and this correction may subsequently be added to the measurements performed by means of the ambient temperature sensor, thereby obtaining reliable ambient temperature values. Assuming that the fault on the ambient temperature sensor variates slower than other variations in the system, it may not be required to derive the correction continuously. Instead, the correction may be derived with certain intervals, and a fixed correction may be added to the measured ambient temperature. This reduces the processing load.

The method may further comprise the steps of:
  comparing ambient temperatures derived by means of the model and the derived model parameters to ambient temperatures measured by means of the ambient temperature sensor,
  in the case that the difference between the derived ambient temperatures and the measured ambient temperatures is below a predefined threshold value, operating the vapour compression system based on the measured ambient temperatures, and
  in the case that the difference between the derived ambient temperatures and the measured ambient temperatures is above the predefined threshold value, operating the vapour compression system based on the derived ambient temperatures.

According to this embodiment, the derived ambient temperature values are only applied when it is established that there is a discrepancy between the measured ambient temperatures and the derived ambient temperatures, and the measured ambient temperatures may therefore be considered unreliable. However, as long as the measurements performed by means of the ambient temperature sensor may be considered reliable, the ambient temperatures obtained in this manner are applied.

The method may further comprise the steps of:
  repeating the steps of selecting a time period and obtaining measurements during the selected time period, and
  updating the model parameters for the model, based on the obtained measurements.

According to this embodiment, the model is repeatedly improved by collecting more data providing information of the correlation between the ambient temperature and the at least one further parameter, in the manner described above.

BRIEF DESCRIPTION OF THE DRAWINGS

The invention will now be described in further detail with reference to the accompanying drawings in which.

DETAILED DESCRIPTION

Figure 1:
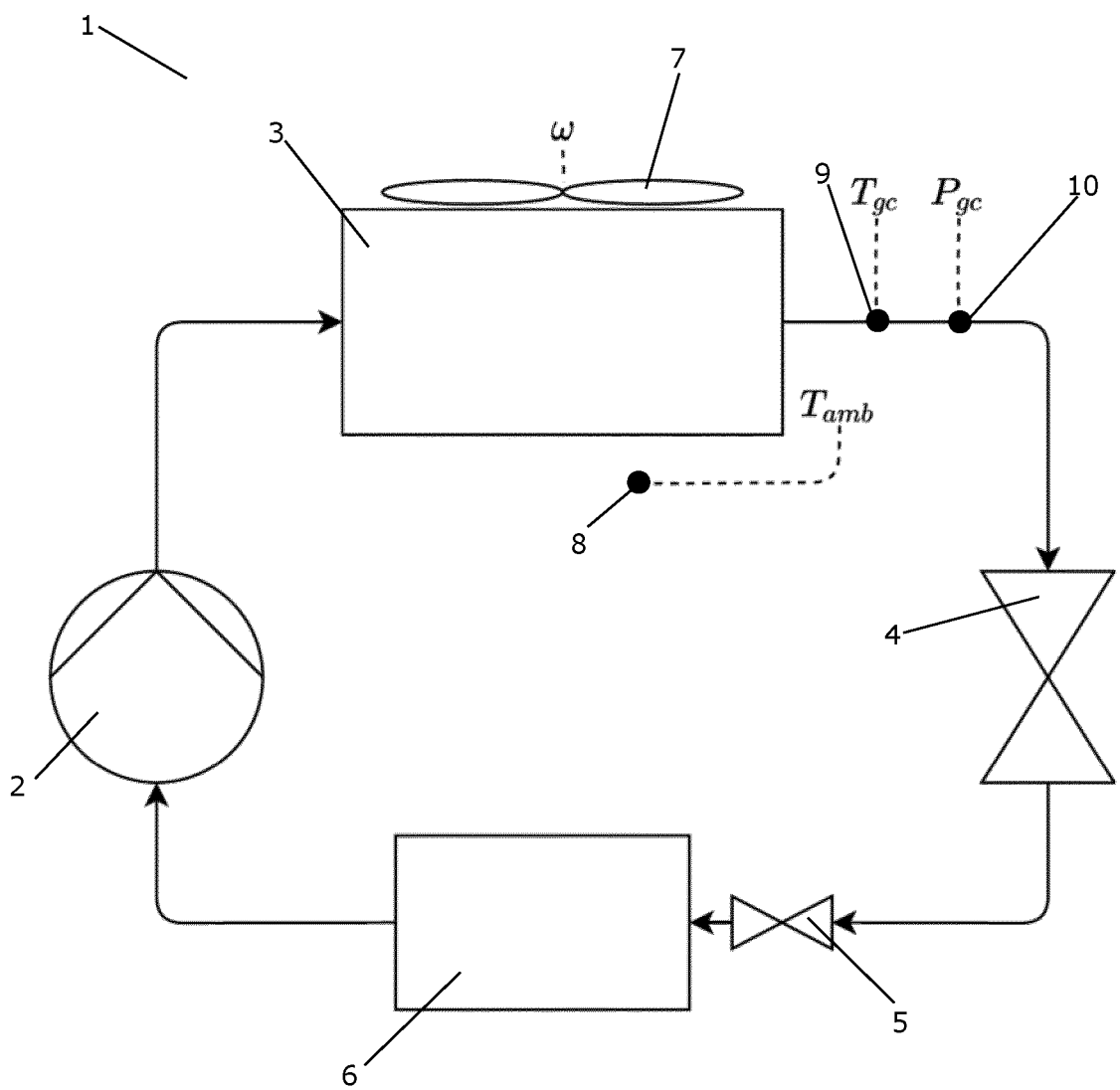
FIG. 1 is a diagrammatic view of a vapour compression system being controlled in accordance with a method according to an embodiment of the invention.

FIG. 1 is a diagrammatic view of a vapour compression system 1 being controlled in accordance with a method according to an embodiment of the invention. The vapour compression system 1 comprises a compressor 2, a heat rejecting heat exchanger 3, an injection valve 4, and expansion device 5, in the form of an expansion valve, and an evaporator 6 arranged in a refrigerant path. A fan 7 is arranged to drive a secondary flow of ambient air across the heat rejecting heat exchanger 3.

Refrigerant flowing in the refrigerant path is compressed by means of the compressor 2 before being supplied to the heat rejecting heat exchanger 3. In the heat rejecting heat exchanger 3, heat exchange takes place between the refrigerant and the flow of ambient air driven by the fan 7, in such a manner that heat is rejected from the refrigerant. The heat rejecting heat exchanger 3 may be in the form of a condenser, in which case the refrigerant is at least partly condensed when passing through the heat rejecting heat exchanger 3. Alternatively, the heat rejecting heat exchanger 3 may be in the form of a gas cooler, in which case the refrigerant is cooled, but remains transcritical or is subcooled, when passing through the heat rejecting heat exchanger 3.

The refrigerant leaving the heat rejecting heat exchanger 3 is supplied to the injection valve 4, where the refrigerant undergoes expansion and the pressure is reduced. The refrigerant is then supplied to the expansion device 5, where it undergoes further expansion, before being supplied to the evaporator 6. Accordingly, the refrigerant being supplied to the evaporator 6 is in a mixed liquid and gaseous state.

In the evaporator 6, heat exchange takes place between the refrigerant and air inside a refrigerated volume, in such a manner that heat is absorbed by the refrigerant, while the liquid part of the refrigerant is at least partly evaporated. Finally, the refrigerant is once again supplied to the compressor 2.

During operation of the vapour compression system 1, an ambient temperature, $T_{amb}$, is measured by means of an ambient temperature sensor 8. Furthermore, the temperature of refrigerant leaving the heat rejecting heat exchanger 3, $T_{gc}$, is measured by means of the a temperature sensor 9, and the pressure of refrigerant leaving the heat rejecting heat exchanger 3, $P_{gc}$, is measured by means of a pressure sensor 10.

Setpoint values for the temperature, $T_{gc}$, and the pressure, $P_{gc}$, of refrigerant leaving the heat rejecting heat exchanger 3 are derived from the ambient air temperature, $T_{amb}$. The vapour compression system 1 is then operated in accordance with the derived setpoint values.

However, in the case that the ambient temperature sensor 8 is exposed to solar heating, the measurements performed by means of the ambient temperature sensor 8 may be unreliable. Therefore, when this is the case, an estimated or derived value of the ambient air temperature is applied instead. The estimated or derived value of the ambient air temperature is obtained in the following manner.

A time period during which the ambient temperature sensor 8 is unexposed to solar heating is selected. This could, e.g., be a time period during night time, a time period where it is known that the ambient temperature sensor 8 is in the shade, or a time period during which cloudy conditions have been detected. In any event, since the ambient temperature sensor 8 is unexposed to solar heating during the selected time period, it is ensured that the ambient temperature sensor 8 is under fault free conditions, at least with respect to solar heating, and that the measurements performed by the ambient temperature sensor 8 during the selected time period can therefore be considered reliable.

Thus, during the selected time period, the vapour compression system 1 is operated, while measurements are obtained by means of the ambient temperature sensor 8, the temperature sensor 9 and the pressure sensor 10. Accordingly, concurrent measurements of the ambient temperature, $T_{amb}$, the temperature of refrigerant leaving the heat rejecting heat exchanger 3, $T_{gc}$, and the pressure of refrigerant leaving the heat rejecting heat exchanger 3, $P_{gc}$, are obtained, under conditions where the measurements of the ambient temperature, $T_{amb}$, are considered reliable.

Based on the obtained measurements, model parameters for a model of at least the heat rejecting heat exchanger 3 are derived. The model provides correlation between the ambient air temperature, $T_{amb}$, on the one hand, and the temperature, $T_{gc}$, and the pressure, $P_{gc}$, of refrigerant leaving the heat rejecting heat exchanger 3 on the other hand.

Subsequently, when the ambient temperature sensor 8 may be exposed to solar heating, ambient temperatures may be derived by means of the model, and based on measurements of the temperature, $T_{gc}$, and the pressure, $P_{gc}$, of refrigerant leaving the heat rejecting heat exchanger 3. The derived ambient temperature is then applied when deriving the setpoint values. Thereby appropriate control of the vapour compression system 1 is obtained, also when the ambient temperature sensor 8 is exposed to solar heating, and thereby unable to provide reliable measurements.

Figure 2:
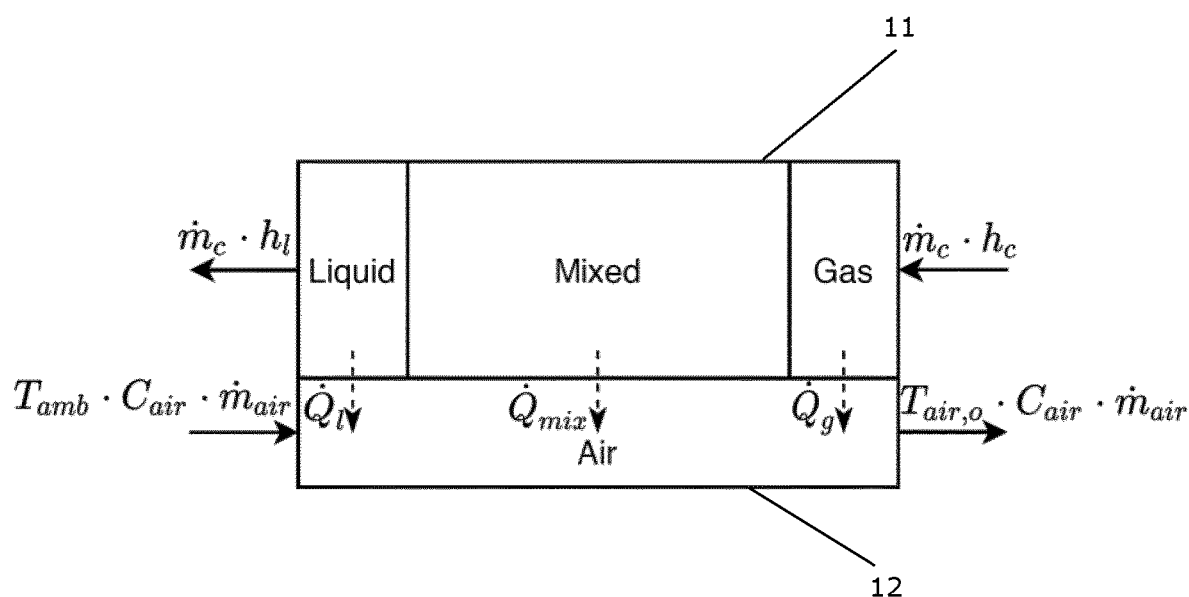
FIG. 2 illustrates heat transfer taking place in a heat rejecting heat exchanger of a vapour compression system being controlled in accordance with a method according to an embodiment of the invention.

FIG. 2 illustrates heat transfer taking place in a heat rejecting heat exchanger. The heat rejecting heat exchanger could, e.g., be the heat rejecting heat exchanger 3 of the vapour compression system 1 illustrated in FIG. 1.

The upper part 11 of the drawing represents refrigerant flow inside the heat rejecting heat exchanger, and the lower part 12 of the drawing represents a secondary flow of ambient air across the heat rejecting heat exchanger.

Refrigerant enters the heat rejecting heat exchanger in a substantially gaseous state, with a mass flow rate, $\dot{m}_c$, and a specific enthalpy, $h_c$. As the refrigerant passes through the heat rejecting heat exchanger, it is at least partly condensed. Thereby a gas zone, a mixed zone and a liquid zone are formed. The refrigerant leaves the heat rejecting heat exchanger with a mass flow rate, $\dot{m}_c$, naturally, being identical to the mass flow rate of the refrigerant entering the heat rejecting heat exchanger, and a specific enthalpy, $h_l$.

The air of the ambient air flow enters the heat rejecting heat exchanger with a temperature, $T_{amb}$, being equal to the ambient temperature, a specific heat capacity, $C_{air}$, and a mass flow rate, $\dot{m}_{air}$. The air of the secondary ambient air flow leaves the heat rejecting heat exchanger with a temperature, $T_{air,o}$, a specific heat capacity, $C_{air}$, and a mass flow rate, $\dot{m}_{air}$.

While the refrigerant passes through the heat rejecting heat exchanger and the ambient air flow flows across the heat rejecting heat exchanger, heat exchange takes place between the refrigerant and the ambient air flow in such a manner that heat is transferred from the refrigerant to the ambient air flow. The heat transfer takes place from the gas zone, the mixed zone and the liquid zone by heat transfer rates $\dot{Q}_g$, $\dot{Q}_{mix}$ and $\dot{Q}_l$, respectively. The heat transfer rates of the various zones most likely differ from each other, and therefore the total heat transfer from the refrigerant to the ambient air flow depends, among other things, on the distribution of the zones along the heat rejecting heat exchanger. However, since heat is transferred from the refrigerant to the ambient air flow, $h_l < h_c$, and $T_{air,o} > T_{amb}$.

Subject to certain assumptions, a model for the energy balance in the system illustrated in FIG. 2 can be derived, and the derived energy balance can be applied for constructing a data driven model of the heat rejecting heat exchanger, from which the ambient temperature can be derived.

Figure 3:
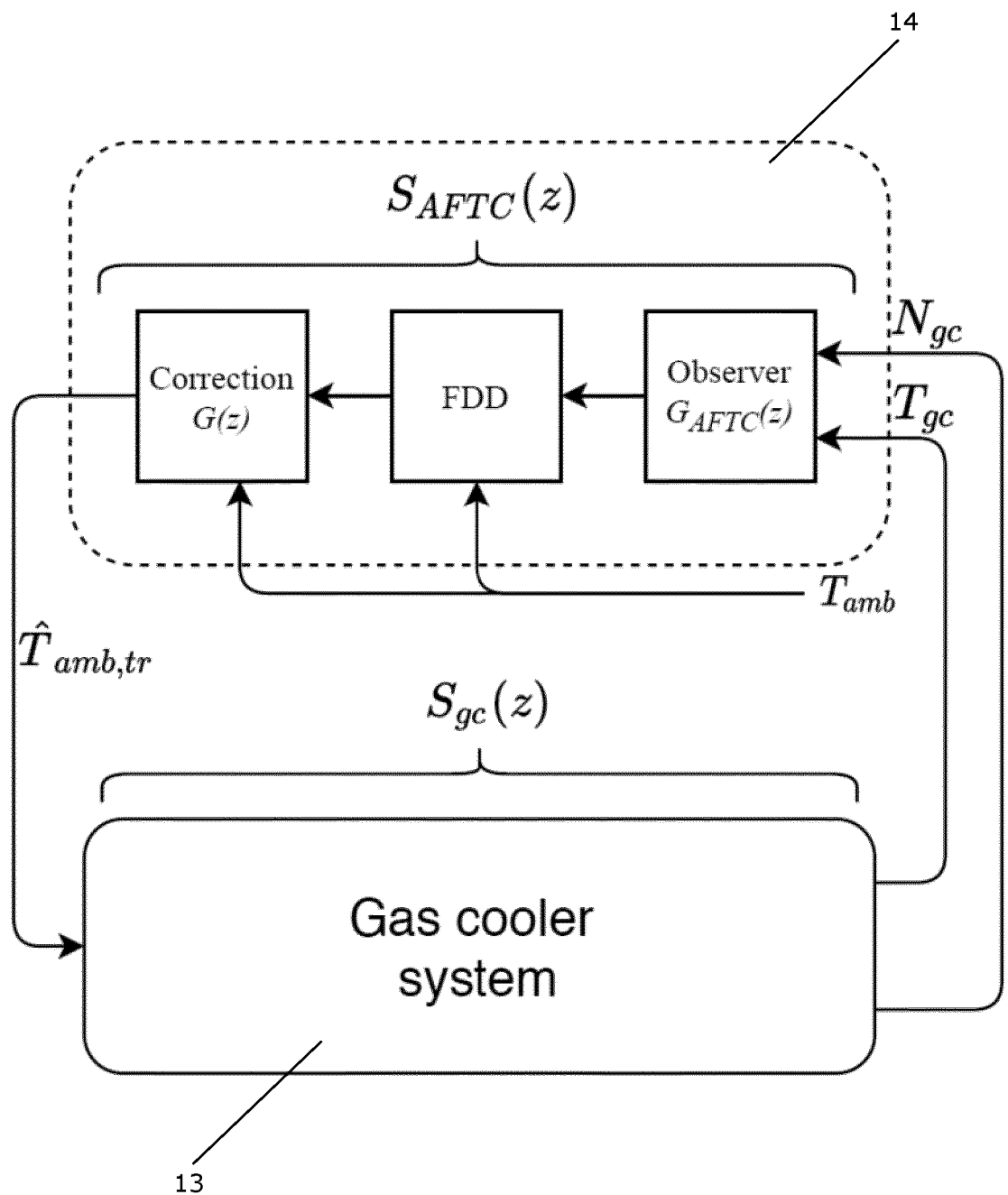
FIG. 3 is a block diagram illustrating a method according to a first embodiment of the invention.

FIG. 3 is a block diagram illustrating a method according to a first embodiment of the invention. A gas cooler system 13 represents operation of a heat rejecting heat exchanger of a vapour compression system, e.g. similarly to the system illustrated in FIG. 2. During operation of the vapour compression system, the temperature of refrigerant leaving the heat rejecting heat exchanger, $T_{gc}$, and a fan speed of a fan driving a secondary ambient air flow across the heat rejecting heat exchanger, $N_{gc}$, are measured and supplied to an Active Fault Tolerant Control (AFTC) loop 14. Furthermore, the ambient temperature, $T_{amb}$, is also measured and supplied to the AFTC loop 14. The AFTC loop 14 calculates a correction to the ambient temperature, $T_{amb}$, based on a model derived essentially in the manner described above, and based on $T_{gc}$ and $N_{gc}$. The AFTC loop 14 outputs a corrected ambient temperature, $\hat{T}_{amb,tr}$, and supplies this to the gas cooler system 13. $\hat{T}_{amb,tr}$ is then applied during control of the vapour compression system instead of the measured ambient temperature, $T_{amb}$.

$S_{AFTC}(z)$ represents a transfer function of the ATFC loop 14, and $S_{gc}(z)$ represents a transfer function of the gas cooler system 13 from $\hat{T}_{amb,tr}$ to $N_{gc}$ and $T_{gc}$. $S_{AFTC}(Z)$ is designed such that its dynamics are significantly slower than the dynamics of the system being controlled in order to avoid instability.

Figure 4:
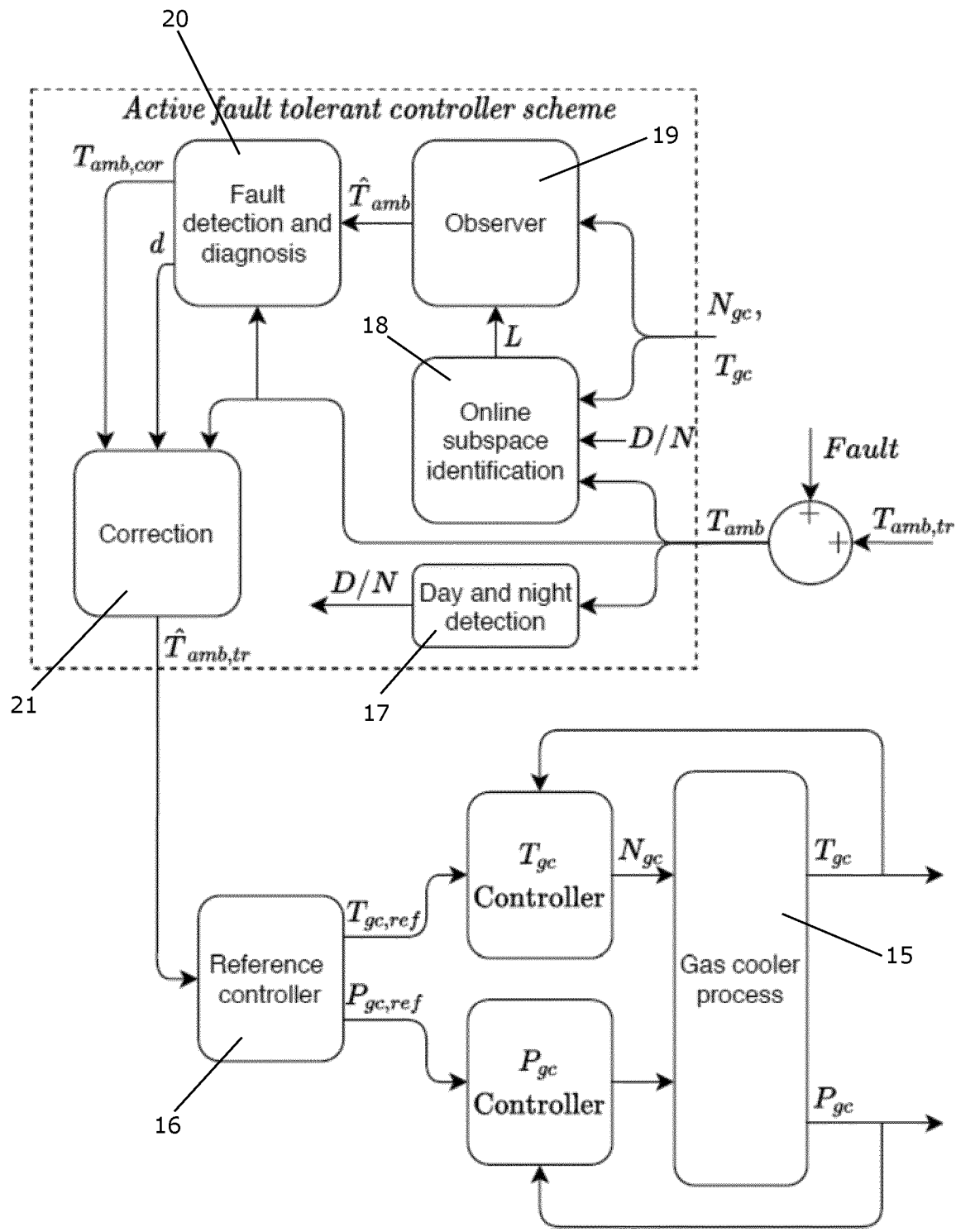
FIG. 4 is a block diagram illustrating a method according to a second embodiment of the invention.

FIG. 4 is a block diagram illustrating a method according to a second embodiment of the invention. A gas cooler process 15 controls the temperature, $T_{gc}$, and the pressure, $P_{gc}$, of refrigerant leaving the heat rejecting heat exchanger, according to setpoint values. The setpoint values are derived by a reference controller 16 in the following manner.

The ambient temperature, $T_{amb}$, is measured and supplied to a 'day and night' detection module 17, where it is determined whether it is day time or night time. In the case that it is night time, it is concluded that the ambient temperature sensor is unexposed to solar heating, and training of a model of the vapour compression system is performed at an 'online subspace identification' module 18. The training of the model is based on the measured ambient temperature, $T_{amb}$, and measured values of the temperature of refrigerant leaving the heat rejecting heat exchanger, $T_{gc}$, and a fan speed of a fan driving a secondary ambient air flow across the heat rejecting heat exchanger, $N_{gc}$.

The resulting model, L, is supplied to an 'observer' module 19. Subsequently, the ambient temperature sensor may be exposed to solar heating, and measurements performed by means of the ambient temperature sensor may therefore be unreliable. Then the 'observer' module 19 derives ambient temperatures, $\hat{T}_{amb}$, based on the derived model, L, and measured values of $T_{gc}$ and $N_{gc}$. The derived ambient temperature, $\hat{T}_{amb}$, is supplied to a 'fault detection' module 20, where the measured ambient temperature, $T_{amb}$, and the derived ambient temperature, $\hat{T}_{amb}$, are compared. Based on the comparison, a correction to the ambient temperature, $\hat{T}_{amb,cor}$, is calculated, and a true ambient temperature, $\hat{T}_{amb,tr}$, is calculated based thereon by a correction module 21.

The true ambient temperature, $\hat{T}_{amb,tr}$, is supplied to the reference controller 16, and the reference controller 16 derives the setpoint values based thereon.

Figure 5:
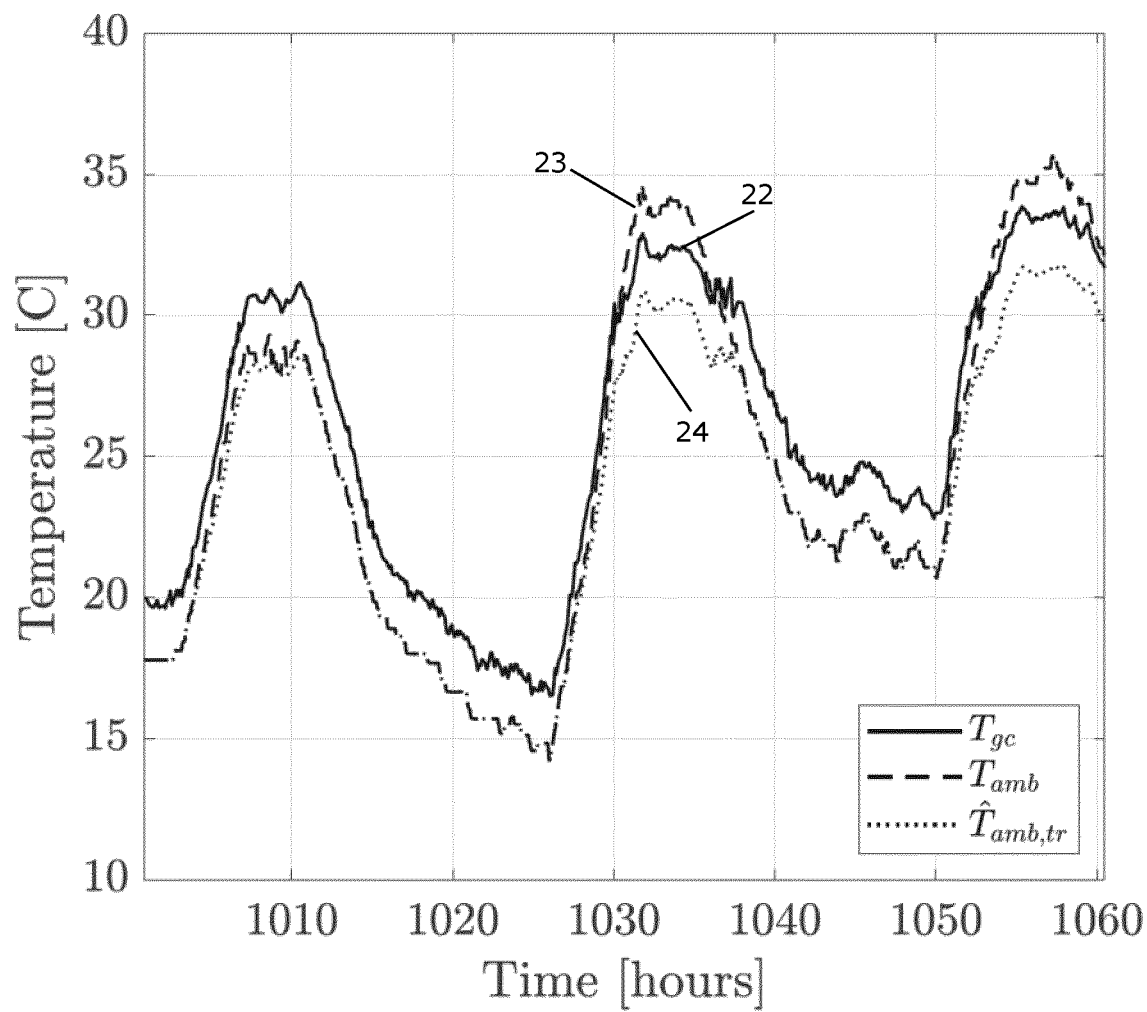
FIG. 5 is a graph illustrating temperature of refrigerant leaving the heat rejecting heat exchanger, measured ambient temperature and derived ambient temperature as a function of time.

FIG. 5 is a graph illustrating temperature of refrigerant leaving the heat rejecting heat exchanger 22, measured ambient temperature 23 and derived ambient temperature 24 as a function of time. The derived ambient temperature 24 is derived based on a model and essentially in the manner described above. All three signals variate in a sinusoidal like manner, in accordance with expected temperature variations as a function of the time of the day. Thus, the peaks of the signals correspond to noon, and the valleys of the signals correspond a point in time immediately before sunrise.

In the first peak near t=1010, it can be seen that the measured ambient temperature 23 and the derived ambient temperature 24 essentially coincide. This is an indication that the measurements performed by means of the ambient temperature sensor are reliable.

In the following two peaks near t=1035 and near t=1060, there is a significant difference between the measured ambient temperature 23 and the derived ambient temperature 24. Furthermore, the measured ambient temperature 23 is higher than the temperature of refrigerant leaving the heat rejecting heat exchanger 22, and this is physically impossible. Accordingly, it can be concluded that the measurements performed by means of the ambient temperature sensor are unreliable. Therefore, during these time intervals, the derived ambient temperature 24 is applied for controlling the vapour compression system, rather than the measured ambient temperature 23.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising at least one compressor, a heat rejecting heat exchanger, at least one expansion device and at least one evaporator, arranged in a refrigerant path, each evaporator being arranged in thermal contact with a refrigerated volume, and each expansion device being arranged to supply refrigerant to an evaporator, the vapour compression system further comprising an ambient temperature sensor arranged to measure an ambient temperature, the method comprising the steps of:
    selecting a time period during which the ambient temperature sensor is unexposed to solar heating,
    during the selected time period, obtaining measurements of the ambient temperature by means of the ambient temperature sensor, and obtaining measurements of at least one further parameter related to the vapour compression system, while operating the vapour compression system,
    deriving model parameters for a model of at least a part of the vapour compression system, based on the obtained measurements, the model providing correlation between the ambient temperature and the at least one further parameter,
    subsequently operating the vapour compression system based on measurements of the at least one further parameter and based on ambient temperatures derived by means of the model including the derived model parameters,
    comparing ambient temperatures derived by means of the model and the derived model parameters to ambient temperatures measured by means of the ambient temperature sensor,
    in the case that the difference between the derived ambient temperatures and the measured ambient temperatures is below a predefined threshold value, operating the vapour compression system based on the measured ambient temperatures, and
    in the case that the difference between the derived ambient temperatures and the measured ambient temperatures is above the predefined threshold value, operating the vapour compression system based on the derived ambient temperatures.

2. The method according to claim 1, wherein the model is a model reflecting behaviour of at least a part of the vapour compression system.

3. The method according to claim 1, wherein the model is a model of at least the heat rejecting heat exchanger.

4. The method according to claim 1, wherein the step of selecting a time period comprises selecting a time period during night time.

5. The method according to claim 4, wherein the step of selecting a time period comprises the steps of:
    measuring ambient temperatures during a continuous time interval of at least 24 hours, by means of the ambient temperature sensor, identifying time intervals with high ambient temperatures as day time and time intervals with low ambient temperatures as night time, calibrating a clock, based on the identified day times and night times, and selecting a time period during night time, based on the calibrated clock.

6. The method according to claim 1, wherein the step of deriving model parameters comprises constructing a linear data driven model.

7. The method according to claim 1, wherein the at least one further parameter comprises fan speed of a fan driving a secondary fluid flow across the heat rejecting heat exchanger and/or temperature of refrigerant leaving the heat rejecting heat exchanger.

8. The method according to claim 1, wherein the step of subsequently operating the vapour compression system comprises deriving a setpoint value for a temperature and/or a pressure of refrigerant leaving the heat rejecting heat exchanger, based on the derived ambient temperature, and subsequently operating the vapour compression system in accordance with the derived setpoint value(s).

9. The method according to claim 1, wherein the step of subsequently operating the vapour compression system comprises deriving an ambient temperature correction, based on the model and the derived model parameters, and correcting ambient temperatures measured by means of the ambient temperature sensor by the ambient temperature correction.

10. The method according to claim 1, further comprising the steps of:

repeating the steps of selecting a time period and obtaining measurements during the selected time period, and updating the model parameters for the model, based on the obtained measurements.

11. The method according to claim 2, wherein the model is a model of at least the heat rejecting heat exchanger.

12. The method according to claim 2, wherein the step of selecting a time period comprises selecting a time period during night time.

13. The method according to claim 3, wherein the step of selecting a time period comprises selecting a time period during night time.

14. The method according to claim 2, wherein the step of deriving model parameters comprises constructing a linear data driven model.

15. The method according to claim 3, wherein the step of deriving model parameters comprises constructing a linear data driven model.

16. The method according to claim 4, wherein the step of deriving model parameters comprises constructing a linear data driven model.

17. The method according to claim 5, wherein the step of deriving model parameters comprises constructing a linear data driven model.

18. A method for controlling a vapour compression system, the vapour compression system comprising at least one compressor, a heat rejecting heat exchanger, at least one expansion device and at least one evaporator, arranged in a refrigerant path, each evaporator being arranged in thermal contact with a refrigerated volume, and each expansion device being arranged to supply refrigerant to an evaporator, the vapour compression system further comprising an ambient temperature sensor arranged to measure an ambient temperature, the method comprising the steps of:

selecting a time period during which the ambient temperature sensor is unexposed to solar heating, during the selected time period, obtaining measurements of the ambient temperature by means of the ambient temperature sensor, and obtaining measurements of at least one further parameter related to the vapour compression system, while operating the vapour compression system, deriving model parameters for a model of at least a part of the vapour compression system, based on the obtained measurements, the model providing correlation between the ambient temperature and the at least one further parameter, subsequently operating the vapour compression system based on measurements of the at least one further parameter and based on ambient temperatures derived by means of the model including the derived model parameters, repeating the steps of selecting a time period and obtaining measurements during the selected time period, and updating the model parameters for the model, based on the obtained measurements.

19. The method according to claim 18, wherein the model is a model reflecting behaviour of at least a part of the vapour compression system.

20. The method according to claim 18, wherein the model is a model of at least the heat rejecting heat exchanger.

* * * * *